(12) United States Patent
Mondale

(10) Patent No.: US 6,527,223 B1
(45) Date of Patent: Mar. 4, 2003

(54) PLATFORM-TYPE AIRSHIP

(76) Inventor: Richard Warfield Mondale, 111 Ashby St., Elkton, VA (US) 22827

( * ) Notice: Subject to any disclaimer, the term of this patent is extended or adjusted under 35 U.S.C. 154(b) by 0 days.

(21) Appl. No.: 10/212,632

(22) Filed: Aug. 5, 2002

(51) Int. Cl.[7] ............................................. B64B 1/06
(52) U.S. Cl. ........................................ 244/30; 244/125
(58) Field of Search ........................... 244/24, 30, 125, 244/126, 128, 29, 31, 62, 114 R, 116, 206, 70

(56) References Cited

U.S. PATENT DOCUMENTS 5,042,748 A * 8/1991 Conn ........................... 244/33
6,142,414 A * 11/2000 Doolittle ...................... 244/25

FOREIGN PATENT DOCUMENTS

GB 2246995 A * 2/1992 ............. B64B/1/00

* cited by examiner

Primary Examiner—Peter M. Poon
Assistant Examiner—T. D. Collins
(74) Attorney, Agent, or Firm—Heath F. Goodenough, Attorney at Law

(57) ABSTRACT

An airship for lifting and transporting loads, particularly heavy loads. The lifting ability of the airship is given by lighter than air gas contained in bags located between two parallel horizontal platforms constructed in lightweight geodesic fashion, the platform and bag assembly being raised and lowered by means of respectively injecting and exhausting the gas into and from the bags, the whole, together with the lifted object, being moved and steered through the atmosphere by the combined means of conventional powered propeller units and a curtain circumferential to and rotated about the platforms thus using the Magnus Effect.

13 Claims, 4 Drawing Sheets

PLATFORM-TYPE AIRSHIP

BACKGROUND OF THE INVENTION

There are many lifting and transportation devices, but devices to lift particularly large loads efficiently, which is the purpose of the present invention, are few. Commonly used are various types of jacks, which are not mobile, at least not over long distances, and cranes of various types, which may be mobile but often are not easily maneuverable close to the lifting site. Some means of transport in common use, such as trucks, airplanes, helicopters and railroad cars place severe limitations on the size and weight of the objects to be transported. Others, such as barges and ships, and railroad cars, are limited in their points of access so that intermediate means must be used to transport objects to and from them. None of the existing means mentioned has the capability, other than over short distances, of transporting objects directly, from pickup to set-down point in a straight line, or by the Great Circle route between distant points on the Earth's surface All of them are expensive to operate, the cheapest commonly being waterborne, and are damaging in various degrees to the environment.

Often, large objects must be dismantled or broken up, and lifted and transported in sections that are manageable with existing transportation means, which adds greatly to costs. Again, certain objects, such as icebergs which could otherwise be used for desert irrigation, are both too large for existing lifting and transportation means and by their nature cannot be practicably cut into sections. This invention solves these problems.

Recently, interest has rekindled in aerostats, that is, airships and blimps, as means of lifting and transporting heavy objects. However, to contain the lighter-than-air gas providing the lift, a conventional aerostat requires a skin, supported by inner framework limiting the aerostat's size. This in turn limits its displacement, roughly one cubic meter for one pound lift, to an amount too small for loads as heavy as, e.g., icebergs, large buildings, complete dry-docks or dredgers. This invention has no such limitation. In addition, interest in conventional airships waned before World War II after they were involved in a number of famous, lethal disasters. Conventional aerostats also have the disadvantage of needing expensive tethering facilities for periods when they are not in use, since they are vulnerable to high winds. Blimps may be partially collapsed when not in use but they have the same load-capacity limitations as airships.

It is to avoid in novel fashion the disadvantages of the existing means of lifting and transporting objects, particularly heavy and bulky objects, that the present invention of a platform-type airship is directed.

BRIEF SUMMARY OF THE INVENTION

This invention is directed to the lifting and transport of objects, particularly heavy and bulky objects and loads which existing equipment is not capable of handling. However, the airship according to this invention may be manufactured in sizes to lift and transport economically objects well within the volume and weight range of such existing equipment.

The airship that is the preferred embodiment of this invention comprises two similarly-shaped, parallel, horizontal platforms axially in line, but spaced apart, and separated by rigid members or connected by cables, which enclose between the platforms a plurality of gasbags, all with provisions for filling them with, and partially emptying them of lighter-than air gas, such as hydrogen or helium. When filled with gas, the bags lift the combined assembly of themselves, the platforms, and operating accessories, i.e., the assembly that forms the airship, and whatever load is attached. When the gas is partially emptied from the bags, either to the atmosphere or to be compressed and stored, the combined assembly tends to be lowered. The platforms may of course be constructed of any convenient shape, the preferred shape being that of an equilateral triangle having its apexes truncated and beveled, since that shape accords well geometrically with the preferred geodesic structure of the platforms and the disposition of the gasbags.

The airship, after being lifted by the filling of the gas bags, is preferably propelled through the atmosphere by the combined action of an endless curtain arranged around the gas-bag-filled space between the platforms and driven around the space in a clockwise or anticlockwise direction and of separate individual rotatable propeller units. These propeller units are used to steer the airship and to provide an air-stream perpendicularly against the curtain, inducing the well-known Magnus Effect which moves the airship in a horizontal direction at right angles to the direction of the forced air-flow. The further influence of more or less random natural wind movements occurring spontaneously and relative to the airship by reason of its movement tend to modify the direction of the movement from that arising from the forced air-flow. Therefore, in this invention the intensity and direction of the forced air flow is adjusted to accommodate the natural wind flow by a mechanism preferably controlled by a computer so as to navigate the assembly in the direction desired, in a similar fashion to the directional adjustment known as "wind-vectoring" that enables a conventional airplane to remain on course in spite of constant changes of wind direction and speed.

The structures of the platforms of the airship preferably are of the two-dimensional geodesic type which is relatively light for its strength and can be repetitively constructed to extend to almost unlimited dimensions, thus enabling the platforms to enclose an almost unlimited number of gas bags, giving the invention an almost unlimited lifting capacity. The assembly can be constructed and stored on any flat surface of suitable size, including the surface of, for example, a lake or salt flats.

DETAILED DESCRIPTION OF THE INVENTION

This invention relates to an airship of novel type, useful for the lifting and transporting of objects singly and in bulk, particularly heavy objects and heavy loads such as those requiring a hopper or other container. Since the only condition required for an object or other load to be lifted by this invention is that lifting be initially vertically upward, it is useful also for lifting from many locations having ground-level access or egress restricted by, e.g., buildings or natural landscape features. These would present little problem when the airship according to this invention is employed, since it is capable of rising above all buildings and the vast majority of natural barriers. Similarly this invention permits unloading in locations otherwise with difficult access.

The novelty of this invention lies firstly in its two-platform structure, preferably geodesic, which can be built to almost any size and to contain an almost unlimited number of gasbags, thus providing an almost unlimited lifting and carrying capacity; secondly, in its plurality of gasbags and their material of construction which greatly reduce the catastrophic fire risk that discourages use of hydrogen in aerostats available hitherto; thirdly, the invention's preferred combination of a rotating curtain inducing the Magnus Effect with independent multidirectional propeller units, which provides an economical propulsion and steering means hitherto never used in aerostats; fourthly, the ability of an existing airship according to this invention easily to be expanded by adding to the preferred geodesic structures of the platforms, curtain and power units. Other novel features of this invention will be apparent in the following description.

Figure 1:
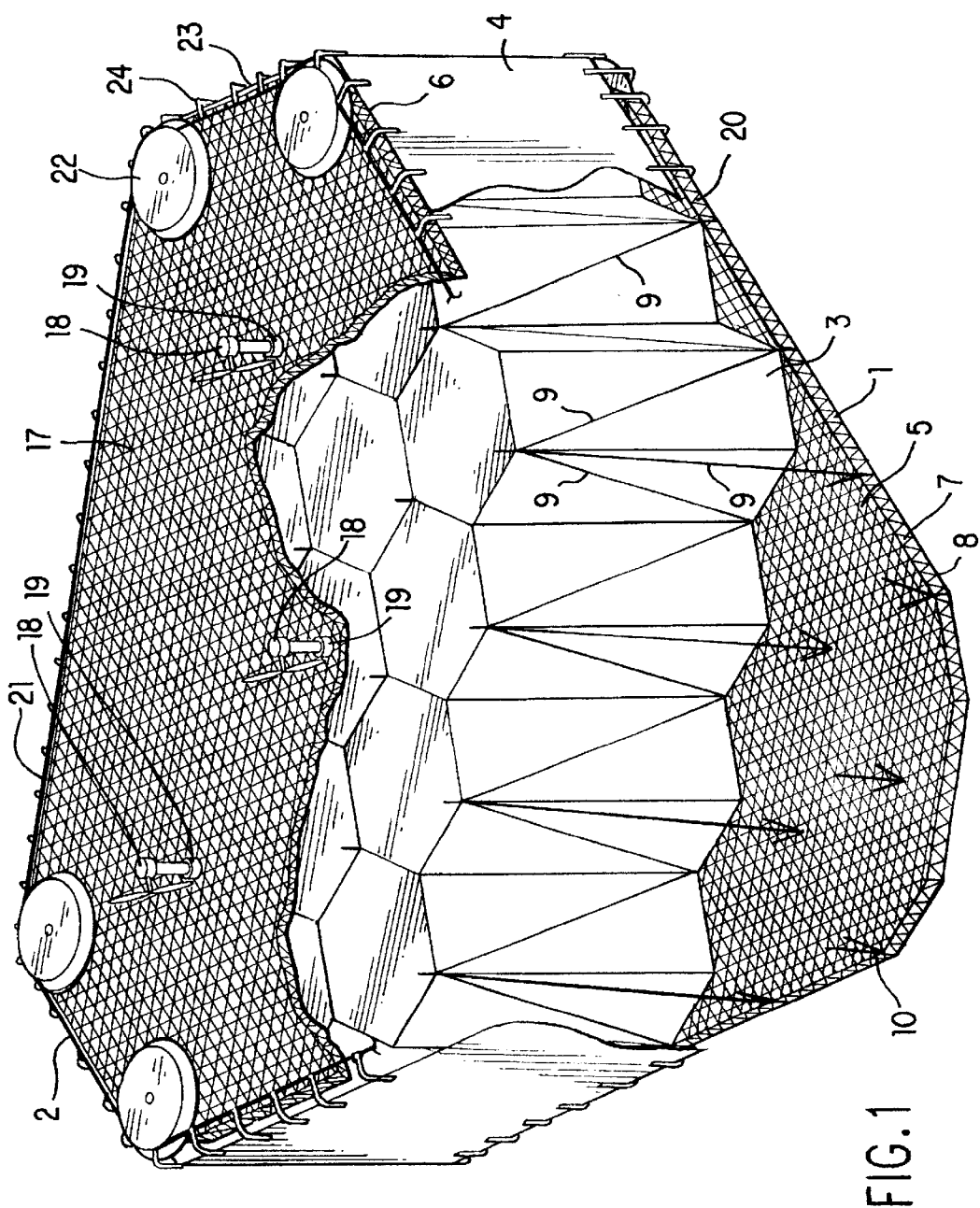
FIG. 1 is an isometric view of the preferred embodiment of the airship according to this invention, with its upper platform, certain platform connecting cables, and curtain cut away to show the hexagonal-section gasbags.

The isometric view of FIG. 1 shows, from obliquely above, the exterior of the preferred embodiment of the airship according to the present invention with part of upper platform 2, certain of connecting means 9, and part of curtain 4 cut away to show the interior disposition of inflated hexagonal-section gas bags 3, five of which have been removed to show part of lower platform 1. As can be seen from FIG. 1, when inflated, gasbags 3 fit closely together and extend from the upper surface 5 of lower platform 1 to the lower surface 6 of upper platform 2, with the result that, when inflated gasbags 3 occupy substantially all of the available space between platforms 1 and 2, the remainder being occupied by connecting means 3, preferably cables, and the small triangular areas of free-locations 27 along platform peripheries 20 and 21.

Gasbags 3 are fabricated of light-weight flexible material; therefore, when they are filled with gas at normal temperature and pressure, such as helium or hydrogen, which is of lower density that the atmosphere in which this invention is used, 3 will exert an upward thrust, of approximately one pound gross per cubic meter of hydrogen, on lower surface 6 of upper platform 2, which will, if its construction is lightweight enough, tend to rise, lifting also lower platform 1, to which platform 2 is attached by a plurality of connecting means 9. The airship can therefore be raised or lowered by the conventional means of pumping gas, assumed herein to be hydrogen since helium is more expensive and may not be easily available, respectively into or out of gasbags 3 each of which is equipped with a conventional pipeline for the supply and exhaustion of gas into and from the gasbag. To lower the airship, for example to prepare for picking up or depositing a load, gas is pumped out of gasbags 3. The gas can then either be exhausted to the atmosphere or pumped under high pressure into storage tanks so that its lifting ability is eliminated. The latter method is preferred for this invention as it permits the amount of gas in gasbags 3 to be adjusted by conventional automatic controls in order to maintain the airship at the desired altitude, and the gas is stored available for reuse. The high-pressure storage tanks may be in metal, but are more likely to be in a high-tensile-strength, impact-resistant plastic.

To maximize the lifting and transportation functions of this invention, it is clear that its components should be as light and strong as possible consistent with the lowest possible cost. To this end, platforms 1 and 2 each preferably are 2-dimensional geodesic structures as developed by R. Buckminster Fuller, that is, an assembly of straight rod-like members all of equal length, joined to form a series of equilateral triangles, each with each of its three sides forming in addition the side of an adjoining triangle. Herein the element termed "surface" as applied to platforms 1 and 2 is to be understood as being composed of said open equilateral triangles, though these may be covered in certain areas for protection of certain parts of the airship, or, for example to provide walkways. The geodesic type of construction used in this invention is shown in FIG. 1, for example in platform 1 where upper surface 5, comprising members arranged and joined to form basic equilateral triangles, is separated from lower surface 8, also comprising members arranged in equilateral triangles, by a layer 7 of identically-sized members arranged into equilateral triangles. Part of the geodesic structure of lower platform 1 is shown in close-up view in FIG. 2. Upper platform 2 is similarly constructed to lower platform 1. It is an important feature of the geodesic structure of platforms 1 and 2, increasing lifting capacity, that its geometry allows gas bags 3 of a convenient hexagonal cross-section to fit together to fill substantially the available space between the platforms 1 and 2, and also allows connecting means 9 to be located in a regular pattern hexagonally to enclose the gasbags, and hold them in position. Apart from lightness and strength, the geodesic form of construction for platforms 1 and 2 has the advantage that it can be constructed to almost any size, on any planar surface, such as level ground or on the surface of a lake, and the airship can be grounded and stored on such a surface without the costly buildings usually required to protect conventional forms of aerostats. There is no obvious, direct necessity for a crew on the airship to ensure its accurate and safe operation, since that can be achieved by remote wireless control, but it is likely that government regulation of aircraft will require an on-board crew to monitor and control flight. Visibility for the crew is provided through openings inherent in the geodesic structure, directly and by conventional television cameras connected to monitors, and the airship is equipped with the usual avionics for blind flying, suitably adapted for operation of this type of airship.

Figure 2:
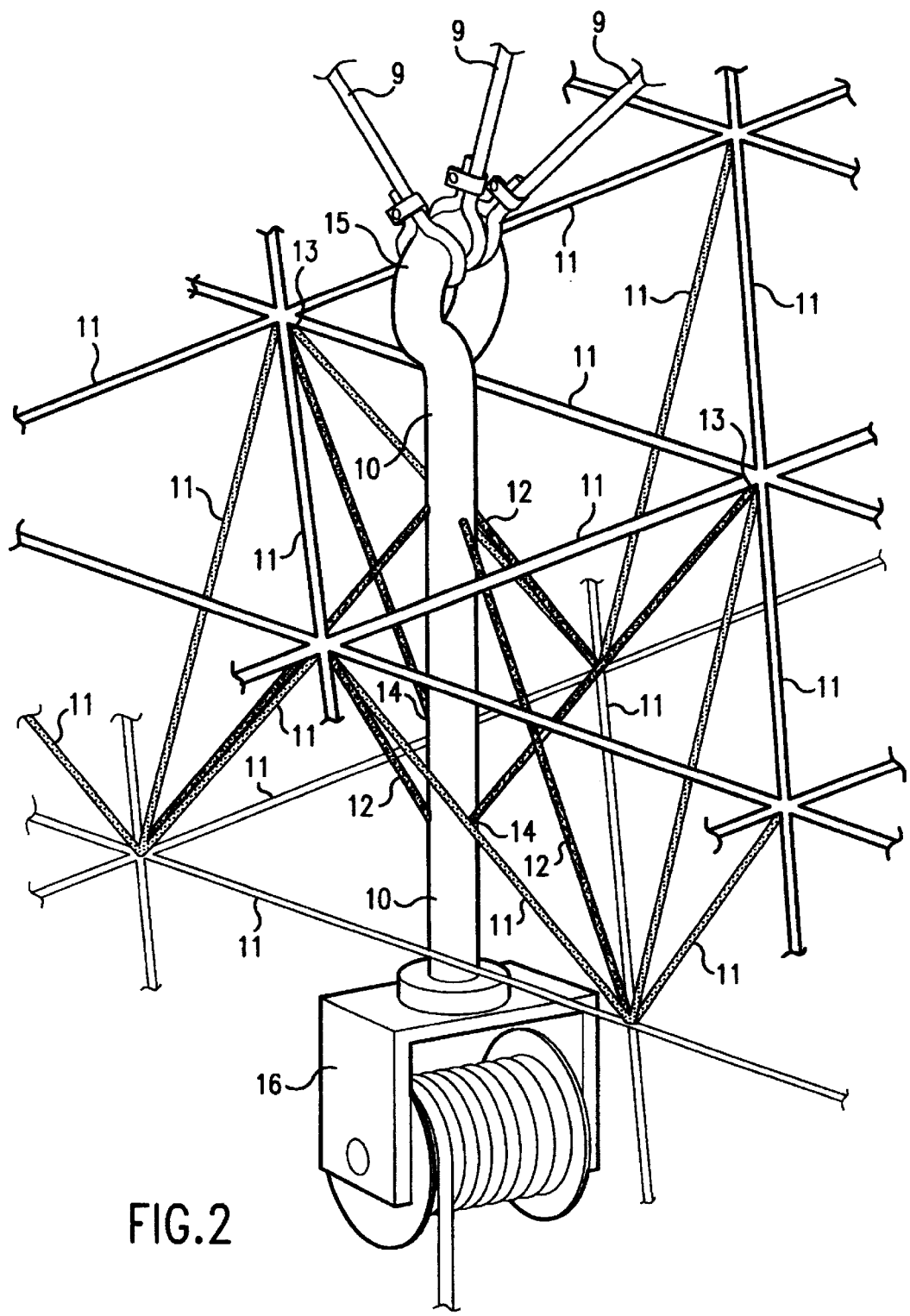
FIG. 2 shows a close-up view of a strut with its supporting framework located within a portion of the geodesic lower platform of the airship, in this case the strut being equipped at its lower end with a winch for lifting and lowering loads or an anchor and at its upper end with an attachment means for the lower ends of the cables connecting the lower platform of the airship to its upper platform.

As shown in FIG. 1, Platforms 1 and 2 are attached by a plurality of connecting means 9, which may be rigid rods or pipes but are preferably cables, for lightness combined with strength and ease of attachment. The preferred form of cables for connecting means 9 will be employed below throughout this description. It can be readily understood that cables 9 will be under tension from the lifting action of gasbags 3 when inflated. It is a characteristic of the geometry of the geodesic construction of platforms 1 and 2 that, as shown in FIGS. 1 and 2, cables 9 are attached in sets of three to struts 10 which are mounted within the thickness of the geodesic structure at regular intervals, enabling the plurality of cables 9 to create open hexagonal forms that enclose gasbags 3. The result is that cables 9 are joined to platforms 1 and 2 as shown in FIG. 1, where they can be seen to enclose the exposed hexagonal-sectioned gasbags 3. Together with platforms 1 and 2, the disposition of the cables 9 as described, under tension from the inflated gasbags 3, creates a third geodesic structure located between platforms 1 and 2, which adds to the rigidity of the overall structure of the airship.

The attachment of a set of three cables 9 to struts 10 is shown in FIG. 2, which gives also a close-up view of the geodesic structure employed in this invention, in this case of platform 1 as an example. Modified versions of strut 10 as shown in FIG. 2 are employed generally in the airship for attaching elements of the invention to platforms 1 and 2 and are entirely supported within the platforms' preferred geodesic structures. All types of strut used in the invention are supported in similar fashion to that shown in FIG. 2, though the load carrying capacity of certain supporting members are varied as necessary to conserve weight, each in the center of a basic equilateral triangle of one of the 2-dimensional geodesic platforms 1 and 2, and each having its support contained within the thickness layer, layer 7 in the case of platform 1, of one of said platforms. An advantageous feature of attaching elements of the invention to struts as shown in FIG. 2, instead of directly to the geodesic structural elements, is that stresses imposed by a strut and whatever is attached to it are taken up at least partially by the support members of the strut, thus minimizing the possibility of damage to the geodesic structure itself.

For convenience of reference, members composing the basic equilateral triangles of the geodesic structure of platforms 1 and 2 are known as "bars", and support members attached to struts are known as "braces". Accordingly, in FIG. 2 members numbered 11 are bars and those attached directly to strut 10 and numbered 12 are braces. Bars and braces, and all other linear elements in the structure of the airship according to this invention, can be made of conventional solid rods, or preferably, for weight-saving, tubes, both circular and square, or, in the case of airships of very large carrying capacities, of essentially one-dimensional geodesic structures, according to the requirements of strength, rigidity, and economy. Such elements may be attached to other elements by welding, bolting, or any type of suitable fastener, while still being within the scope of this invention. In FIG. 2, strut 10 extends vertically through the centers of two equilateral triangles formed by bars 11, the upper triangle forming part of upper surface 5 and the lower triangle forming part of lower surface 8 of lower platform 1. The upper and lower triangles are separated by other equal equilateral triangles formed by bars 11, forming the thickness, that is, layer 7, of lower platform 1. For imparting rigidity to the support of Strut 10, ends 13 of braces 12 are attached by conventional means, including for example welding, at the apexes of the upper triangle, and ends 14 of braces 12 to the lower portion of strut 10, and correspondingly for braces 12 that extend from the lower triangle to the upper portion of strut 10. FIG. 2 shows cables 9 conventionally attached to end 15 of strut 10. FIG. 2 shows a portion of lower platform 1 seen obliquely from above, and end 15 of strut 10 is at the upper end of strut 10. The distal end of cables 9 are attached at the lower surface 6 of platform 2 in similar fashion to ends 15 of struts 10, which are inverted but similarly supported within the geodesic structure of platform 2. One of the characteristics of the geodesic structures of platforms 1 and 2 is that the positions of struts 10 can be arranged in this invention so that cables 9 enclose and are in supportive contact with hexagonal-section gasbags 3. In FIG. 2 conventional winch 16 is attached to spar 10 as an example of a device which, alone, or part of a plurality of such devices, could be used for winding cables in order to attach a load to the airship or to carry an anchoring device for keeping the airship stationary during loading, unloading, and parking. Equally, winch 16 could be replaced by another useful device, such as a hook.

The inflation and deflation of gasbags 3 effect the raising and lowering respectively of the airship and any load attached to it. The transportation of loads horizontally by the airship, however, requires it to have its own means of propulsion and navigation through the atmosphere. In the preferred embodiment of this invention such propulsion and navigation may be provided by powered propeller units 18, or even jet engines, as commonly used for powered flight, mounted preferably on the upper surface 17 of platform 2. In FIG. 1 three propeller units 18 are shown mounted on struts 19 capable of being rotated in any direction in a plane parallel to platform 2 and delivering propulsion in a substantially horizontally plane so as to effect steering of the airship. Struts 19 are controlled via a conventional computer equipped navigation system as used for aircraft to maintain the desired flight path having regard to the changeability of strength and direction of wind.

Propulsion of the airship is preferably achieved by taking advantage of the well-known Magnus Effect, in which a rough-surfaced object, such as a cylinder, or the airship as shown in FIG. 1, when rotating about its axis and subjected to an air current perpendicular to its axis will tend to move in a direction parallel to the tangential motion of its surface at the point first contacted by the air current. This effect will be familiar to many as the cause of the curve-ball phenomenon in baseball. In the case of this invention, it is not the airship as a whole that rotates in order to generate the Magnus Effect, but continuous rough-surfaced flexible curtain 4, which extends between the peripheries 20 and 21 respectively of platforms 1 and 2, surrounding the interior of the airship that contains gasbags 3 and connecting cables 9, and is driven by great-wheels 22, via continuous cables 23 attached to the lower and upper edges of curtain 4 by curtain fasteners 24. Great wheels 22 are driven by conventional motor and control assemblies, mounted on struts 10 within the geodesic structures of platforms 1 and 2, so that their rotational speeds and rotational directions are synchronized and adjusted according to the degree of propulsion required, consistent with the speed and direction of propeller units 18, which themselves are responsible for indirectly inducing an air current against curtain 4. It is important in the weight-saving aspect of construction that its elements should have more than one function. Accordingly, in addition to its use to propel the airship through the atmosphere, curtain 4 also has the advantageous feature that, since it encloses substantially all the elements of this invention located between platform 1 and platform 2, those elements are thereby protected from horizontal air currents and whatever may be carried by them, such as dust or even sand, when, for example, the airship is used to transport an iceberg to a desert region for providing a fresh water supply. The curtain may also be used to display advertising.

Airships according to this invention may be constructed to a very large size. The version of the preferred embodiment illustrated in FIGS. 1 and 3, for example may be approximately 500 feet along each side and capable of lifting about 500 tons. It is within the scope of this invention for additional great wheels 22 to be installed at desired intervals, depending on the size of the airship, along the peripheries 20 and 21, so as better to support and drive cables 23.

Within the scope of this invention, it is also possible to construct an airship having the novel feature of gasbags between two geodesic platforms, but in which propulsion, steering and navigation resemble those of a conventional airplane. That is, with fixed jet or propeller-driving engines, rudder and ailerons, but the preferred embodiment described and illustrated herein has the advantage of lower weight and maneuverability, particularly for airships of the larger sizes and carrying capacities contemplated.

Figure 3:
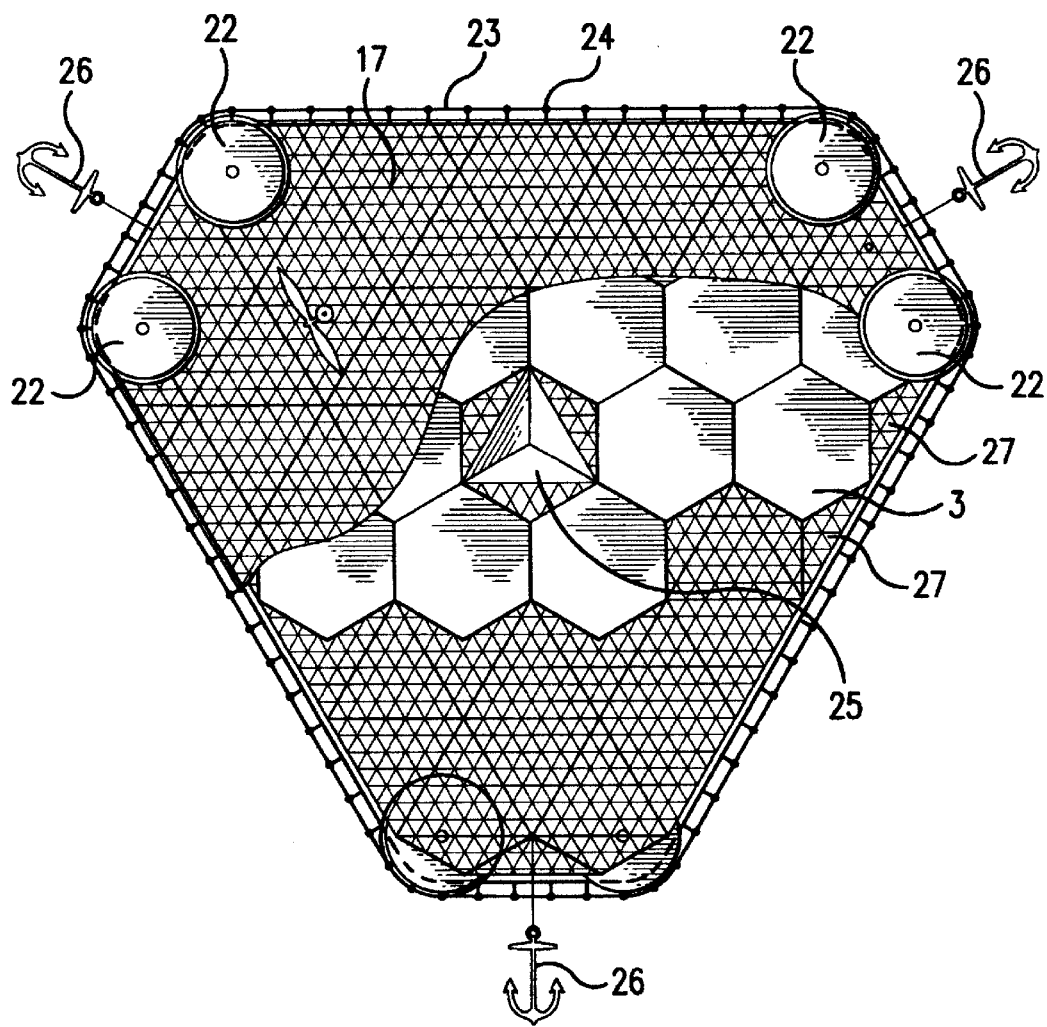
FIG. 3 is a plan view of an embodiment of this invention equipped with a central hopper, with its upper platform cut away to show the hexagonal-section gas bags and the hopper in plan view, and anchors for fixing the location of the airship.

The airship according to this invention may be equipped to lift and transport loads composed of liquid, powder, or such materials as sand and rocks, which require a hopper to accommodate them. Of course an independent, loaded hopper may be lifted and carried by the airship with cables, as with any other single object, but, for long distance transportation, it may be economical to fit a form of hopper into the airship itself, and this is shown in the embodiment of this invention in FIG. 3. FIG. 3 shows a plan view of the airship with part of upper platform 2 and seven gasbags 3 removed, including one bag from the center revealing part of the upper surface 5 of lower platform 1 surrounding a representation, as an example, of an equilateral-triangular-section hopper 25. Such a hopper would most advantageously be loaded at the pick up site. The airship according to this invention would then be lowered over the hopper, to be connected by a quick coupling mechanism for lifting. In place of the hopper, another possible loading mechanism that can be accommodated by the airship is a conventional grab.

FIG. 3 also shows conventional anchors 26 which are used to hold the airship stationary, for instance, for storage or when lifting or setting-down a load, or parking the airship above ground level. To be effective, anchors 26 must of course be capable of attaching themselves, or being attached, to stationary, substantially immoveable surfaces. Anchors 26 are released and drawn in by conventional winches such as that winch 16 shown on strut 10 in FIG. 2, or other conventional means.

Also in FIG. 2 are shown free-locations 27 which are available because of the hexagonal shape of gasbags 3 around peripheries 20 and 21. It is in these locations that conventional accessories necessary for the operation of the airship can be placed. Such accessories include, without limitation, high-pressure gas tanks, pumps and controls for adjusting the upward and downward motion of the airship by varying the amount of hydrogen in the gasbags 3, sensors and controls for navigation of the airship by the propulsion units 18 and the motion of curtain 4, fuel tanks, electric generators and crew accommodation.

Figure 4:
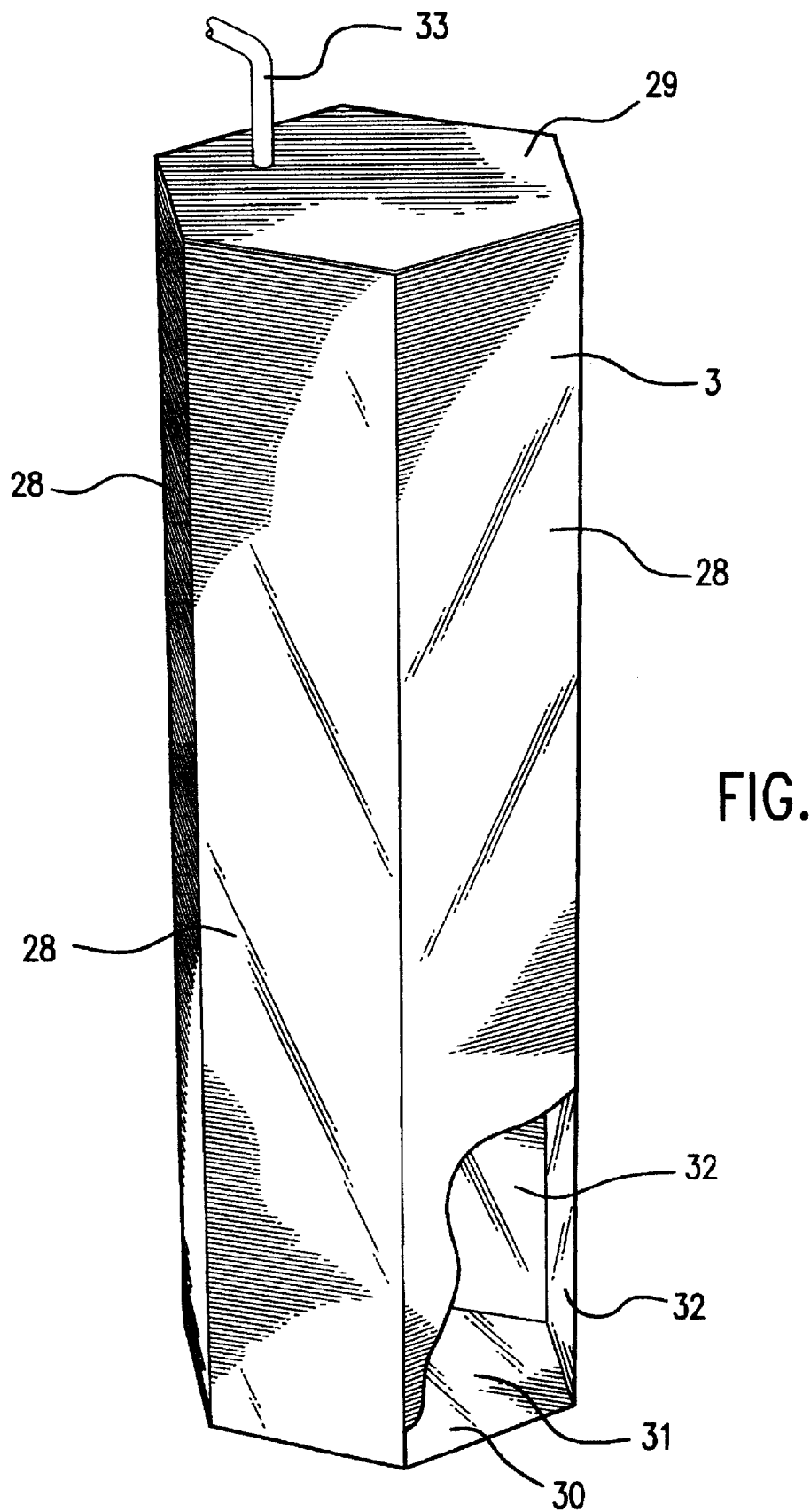
FIG. 4 shows the preferred form of the gasbag element of this invention with a portion of its walls ct away to show the interior of the bottom and two walls.

FIG. 4 shows an isometric view of one of the gasbags 3. An important consideration affecting the economical operation of the airship concerns which gas to use in the gasbags. Helium is desirable for its non-flammability, but it is expensive and may not be available in many parts of the world where the airship according to this invention may be expected to operate. Hydrogen is relatively cheap, but is very flammable in contact with the atmosphere. The geodesic structure of platforms 1 and 2 of the airship according to this invention is not only strong and light in weight, but is particularly suited to the use of a plurality of hexagonal-section gasbags 3 located by cables 9 attached to struts 10 supported within the geodesic platform structures. This is in contrast to existing aerostats, which do not have gasbags all separately exposed to the atmosphere at their upper ends as is the case with gasbags 3 of this invention, which have the useful feature that they localize and vent quickly to the atmosphere above any hydrogen fire that might start within them. This is a particularly useful feature since it practically obviates the hitherto strong fire-risk objection to the use of hydrogen in large commercial aerostats. In this invention, a fire in one gasbag 3 will be immediately vented through the open geodesic structure above, without a tendency to ignite another gasbag or bags by convection. The remaining hazard, that of gasbags overheating by reason of radiant heat from a fire in one or more of their number, is overcome in this invention by making the gasbags of material having a reflective index of 1.0 on the interior sides and bottom of the gasbag so that substantially all the radiant heat is kept within the bag in which the gas is burning. In FIG. 4, hexagonal-section gasbag 3 has all vertical sides 28 and bottom 30 manufactured from a fire resistant material having internal surfaces 32 and 31 respectively, both having a reflective index of as near as possible to 1.0. Hexagonal top 29 is manufactured from any conventional gas-impervious material, polyethylene, for example able to resist temperatures encountered in normal operation of the airship, but of such a melting point that, if a fire were to start in the bag, top 29 would rapidly melt and allow the burning gas to vent quickly through the spaces in upper platform 2, too quickly to cause damage to the structure.

Also shown in FIG. 4 is gas pipe 33, through which the hydrogen is pumped in and out of gasbag 3. This would be conventionally equipped with a valve, not shown, to prevent, in the event of a fire in gasbag 3, fresh hydrogen being pumped into the gasbag 3, or a blowback occurring to the gas supply.

The shape in plan view of the airship may be any reasonable shape that will allow a Magnus-Effect-inducing curtain, as in the case of curtain 4 herein, to be driven at controllable uniform speed around the peripheries of the platforms. Possible shapes therefore include elliptical, oval, oblong, and circular. The shape shown in FIGS. 1 and 3 of an equilateral triangle with its apexes truncated and beveled has been chosen for its efficiency in enclosing the hexagonal gasbags within the geodesic structural scheme.

The foregoing description of the invention has been directed primarily to a particular preferred embodiment in accordance with applicable law and for the purposes of explanation and illustration. It will be apparent, however, to those skilled in the art that modifications and changes in the specifically described apparatus may be made within the scope and true spirit of the present invention, in addition to the alternative versions of the preferred embodiment described above. It is the applicant's intention in the appended claims to cover such modifications and changes.

What is claimed is:

1. An airship for lifting, transporting and depositing loads comprising:

a lower substantially horizontal platform having parallel upper and lower planar surfaces and a periphery;

an upper substantially horizontal platform substantially similar in size and shape to the lower horizontal platform, and having parallel upper and lower planar surfaces and a periphery;

a plurality of platform connecting means connecting the upper and lower platforms and maintaining the platforms parallel and the platforms' peripheries parallel;

located between the platforms, a plurality of gasbags, each having a horizontal top and bottom both having parallel planar upper and lower exterior and interior surfaces and each gasbag also having substantially vertical sides having exterior and interior surfaces, a means of inflation of each gasbag by a gas of lower-than-air density to lift the connected platforms, and a means of deflation of each gasbag to lower the connected platforms, the gasbags when inflated each having a height equal to the maximum distance between the upper and lower platforms, the plurality of bags being so disposed that when all are inflated the upper surfaces thereof are in contact with and occupy substantially all of the lower surface of the upper platform;

means of propelling and steering the lifted connected platforms; and means of controlling the means of propelling and steering, for navigating the lifted connected platforms on a predetermined course;

means of anchoring the connected platforms to stationary, substantially immoveable objects and of releasing the connected platforms therefrom;

means of attaching to the connected platforms loads required to be lifted and transported.

2. An airship as claimed in claim 1, in which the means of anchoring the platforms is a plurality of cables each having a proximal and a distal end, each proximal end being attached to one of the platforms, and each distal end having an anchor capable of being attached to a substantially immoveable object and of being released when required.

3. An airship as claimed in claim 1 in which the means of attaching loads to the platforms is a plurality of cables, each having a proximal and a distal end, each proximal end being attached to one of the platforms, and each distal end capable of being attached to a load.

4. An airship as claimed in claim 1 in which the means of attaching to the platforms loads required to be lifted and transported is a hopper with an hopper attach and release means, for enabling the airship to collect the hopper when full, discharge the hopper, and return the hopper for refilling.

5. An airship as claimed in claim 1 in which the means of propelling and steering the platforms is a plurality of powered propeller units, each mounted on one of the platforms and capable of being rotated as controlled by the propelling and steering control means so as to deliver propulsion in any desired, substantially horizontal direction.

6. An airship as claimed in claim 1 in which the means of propelling and steering the platforms is a combination of a continuous curtain having top and bottom edges moveably disposed at and around the peripheries of the upper and lower platforms respectively, and powered to travel around said peripheries in either direction as controlled by the propelling and steering control, so as to apply the Magnus Effect, and of a plurality of powered propeller units, each mounted on one of the platforms and capable of being rotated as controlled by the propelling and steering control means so as to deliver propulsion in any substantially horizontal direction.

7. An airship as claimed in claim 1 in which the means of navigating the lifted platforms on a predetermined course is a conventional airplane navigation system modified to control the means of propelling and steering the airship.

8. An airship as claimed in claim 1 in which all the gasbags are of identical size and hexagonal horizontal cross-section.

9. An airship as claimed in claim 1 in which the interior surfaces of the sides and the bottom interior surfaces of the gasbags have a reflexive index near 1.0 and the tops are made of material resistant to normal operating temperatures, but of such a melting point that a fire in a gasbag would cause the top of that gasbag rapidly to melt.

10. An airship as claimed in claim 1 in which each platform is a two-dimensional geodesic structure.

11. An airship as claimed in claim 10 in which the connecting means are cables, each with a proximal end and a distal end, the proximal end being attached to a strut attached to and within the geodesic structure of the lower platform and the distal end being attached to a strut attached to and within the geodesic structure of the upper platform.

12. An airship for lifting, transporting and depositing loads comprising:

a lower substantially horizontal platform of two-dimensional geodesic structure having parallel upper and lower planar surfaces and a periphery;

an upper substantially horizontal platform of two-dimensional geodesic structure, substantially similar in size and shape to the lower horizontal platform, and having parallel upper and lower planar surfaces and a periphery;

a plurality of vertical struts attached to and within the geodesic structure of the lower platform and of the upper platform;

a plurality of cables for connecting the upper and lower platforms and maintaining the platforms parallel and the platforms' peripheries parallel, the cables each having two ends, one end attached to one of the struts attached within the lower platform and the other end to one of the struts attached within the upper platform, said cables and struts being of such a number and so respectively attached and disposed as to form a plurality of hexagonal horizontal cross-section enclosures each bounded by six of the cables;

located between the platforms, a plurality of gasbags, each of hexagon horizontal cross-section, each having a horizontal top and bottom both having parallel planar upper and lower exterior and interior surfaces, and each gasbag also having vertical sides having exterior and interior surfaces, a means of inflation by a gas of lower-than-air density for the gasbags to lift the connected platforms, and a means of deflation for the gasbags correspondingly to lower the connected platforms, the interior surfaces of the sides and the lower interior surfaces of the gasbags having a reflexive index near 1.0 and the tops being made of material resistant to normal operating temperatures, but of such a melting point that a fire in a bag would cause the top of said bag rapidly to melt, and each gasbag when inflated having a height equal to the maximum distance between the upper and lower platforms, the plurality of gasbags being so disposed and each gasbag of such a size that each, when inflated, fully occupies one of the hexagonal enclosures formed by six of the cables and is supported and located by the cables, and that when all gasbags are inflated the upper surfaces thereof are in contact with and occupy substantially all of the lower surface of the upper platform;

a plurality of powered propeller units, each mounted on one of the platforms and capable of being rotated under control so as to deliver propulsion in any substantially horizontal direction, for propelling and steering the lifted platforms;

a conventional airplane navigation system modified to control the means of propelling and steering the lifted platforms, for navigating the platforms on a predetermined course;

means of anchoring the connected platforms to a stationary, substantially immoveable object and of releasing the connected platforms therefrom; and means of attaching to the connected platforms loads required to be lifted and transported.

13. An airship for lifting, transporting and depositing loads comprising:

a lower substantially horizontal platform of two-dimensional geodesic structure having parallel upper and lower planar surfaces and a periphery;

an upper substantially horizontal platform of two-dimensional geodesic structure, substantially similar in size and shape to the lower horizontal platform, and having parallel upper and lower planar surfaces and a periphery;

a plurality of vertical struts attached to and within the geodesic structure of the lower platform and of the upper platform;

a plurality of cables for connecting the upper and lower platforms and maintaining the platforms parallel and the platforms' peripheries parallel, the cables each having two ends, one end attached to one of the struts attached within the lower platform and the other end to one of the struts attached within the upper platform, said cables and struts being of such a number and so respectively attached and disposed as to form a plurality of hexagonal horizontal cross-section enclosures each bounded by six of the cables;

located between the platforms, a plurality of gasbags, each of hexagon horizontal cross-section, each having a horizontal top and bottom both having parallel planar upper and lower exterior and interior surfaces, and each gasbag also having vertical sides having exterior and interior surfaces, a means of inflation by a gas of lower-than-air density for the gasbags to lift the connected platforms, and a means of deflation for the gasbags correspondingly to lower the connected platforms, the interior surfaces of the sides and the lower interior surfaces of the gasbags having a reflexive index near 1.0 and the tops being made of material resistant to normal operating temperatures, but of such a melting point that a fire in a bag would cause the top of said bag rapidly to melt, and each gasbag when inflated having a height equal to the maximum distance between the upper and lower platforms, the plurality of gasbags being so disposed and each gasbag of such a size that each, when inflated, fully occupies one of the hexagonal enclosures formed by six of the cables and is supported and located by the cables, and that when all gasbags are inflated the upper surfaces thereof are in contact with and occupy substantially all of the lower surface of the upper platform;

for propelling and steering the lifted platforms, a combination of a continuous curtain having top and bottom edges moveably disposed at and around the peripheries of the upper and lower platforms respectively, and powered to travel around said peripheries in either direction under control, so as to apply the Magnus Effect, and of a plurality of powered propeller units, each mounted on one of the platforms and capable of being rotated under control so as to deliver propulsion in any substantially horizontal direction;

a conventional airplane navigation system modified to operate and control the means of propelling and steering the lifted platforms, for navigating the platforms on a predetermined course;

means of anchoring the connected platforms to a stationary, substantially immoveable object and of releasing the connected platforms therefrom; and means of attaching to the connected platforms loads required to be lifted and transported.

* * * * *